Dec. 29, 1970 K. MICHEL 3,551,019
UNIVERSAL MICROSCOPE
Filed Nov. 20, 1968 3 Sheets-Sheet 1

United States Patent Office 3,551,019
Patented Dec. 29, 1970

3,551,019
UNIVERSAL MICROSCOPE
Kurt Michel, Aalen, Wurttemberg, Germany, assignor to Carl Zeiss-Stiftung, doing business as Carl Zeiss, Heidenheim (Brenz), Wurttemberg, and Oberkochen, Wurttemberg, Germany, a corporation of Germany
Filed Nov. 20, 1968, Ser. No. 784,514
Claims priority, application Germany, Nov. 21, 1967, A 10,494
Int. Cl. G02b 21/00, 21/06
U.S. Cl. 350—18                     5 Claims

ABSTRACT OF THE DISCLOSURE

A microscope has cooperative parts and accessories in separate units. The objective and eyepiece units have a straight optical path therethrough with the eyepiece unit mounted on the base unit. A specimen stage unit is mounted on the base unit and light sources are mounted for directing illumination either to the specimen stage or through the base unit. Image reproducing unit, measuring unit and filtering unit are also provided.

---

The present invention is a universal microscope in which its components and accessories are in various separate units which are adapted to be cooperatively mounted adjacent to one another in alternative arrangements to provide a microscope having a variety of selectable capabilities.

The units, separately or in suitable combinations, include, or may be adapted to include, means for providing a bright and dark field illumination in transmitted light or vertical light, for phase contrast, interference contrast, polarized light or fluorescence microscopy. Other units, or combinations of the units include, or may be adapted to include, means for photographic, cinematographic or television reproduction of the microscopic images, as well as for photoelectric measuring techniques for the purpose of determining optical characteristic quantities such as, for instance, light transmission, reflectivity or the optical thickness of microscopic specimen.

In addition, the unit structure and arrangement in accordance with the invention enables other accessory units to be utilized in the combination for specific purposes such as micro-hardness examination or for use of the ultraviolet microbeam technique in vertical light, which is carried out under simultaneous observation according to the phase contrast technique.

The unit construction and arrangement in accordance with this invention provides a microscope having unusual stability. The specimen stage remains stable in the desired plane, there is little tendency of the objective and eyepiece to vibrate, and the arrangement is such that the operative alignment of the elements is free of the distortion which is apt to be caused by the heat of the condenser in some microscope structures.

In accordance with the invention the objective of the microscope is in a base unit. The optical path through the objective is straight through the unit and the unit is compatibly shaped with respect to other units which contain other elements of the microscope so that a group of units necessary to provide the essential elements for the microscope are adapted to be mounted on the base unit and on each other in various arrangements in which the optical paths through adjacent units are in alignment to provide the complete optical axis of the instrument and in which a unit containing light sources is adapted to provide alternative forms of illumination—through the specimen stage or into the optical path through the base unit.

In a preferred form the several units are generally rectangular with all the units except the illuminating unit adapted to be stacked on one another to provide a straight vertical optical path through or into the units respectively containing the objective, the eyepiece, the specimen stage and reproducing or measuring elements. The illuminating unit containing the light sources is adapted to be mounted at the side of the track of other units with suitable paths for illumination from the light sources in the illuminating unit to be directed by suitable reflectors axially through the specimen stage, or alternatively, axially into the optical path through the base unit. The several units thus assembled to provide the operable microscope may be connected together in cooperative alignment by suitable releasable connecting means.

In the preferred form, adjacent abutting sides of the units which are stacked vertically are in parallel horizontal planes. The optical path from the location of the specimen being examined through the objective and through the eyepiece unit to the image measuring or reproducing units is in a straight vertical line through the stack and the cross-sectional configurations of the units in the vertical stack are radially symmetrical with respect to the optical axis of the optical path. Thus, the formation of an image of the specimen being examined and the accuracy of image reproduction or measurement will not be distorted by thermal expansion and contraction of the units and of the elements therein.

The base unit containing the objective is constructed with openings in the sides for access to an adjusting screw for focusing the objective. The objective is provided by one of three different objective lenses on a turret which is rotatable for interposing the desired objective lens into the optical path through the base unit.

The eyepiece unit suitably has two eyepieces projecting from different sides of the unit to enable two persons to view the image at the same time. Also, the two eyepieces are arranged on the sides of the unit so as not to interfere with the placement of the eyepiece unit on the base unit with either opposite side of the eyepiece unit against the appropriate side of the base unit, and so as to enable a reproducing unit or a measuring unit to be mounted on the eyepiece unit, when the latter is on the base unit. As mentioned, the optical path extends vertically through the eyepiece unit. The eyepieces are operatively cut into the optical path by suitable reflectors, and accessory units having image reproducing or measuring means therein may be mounted on the eyepiece unit so that the latter means are in operative alignment with the optical path. Thus, the microscope of this invention is adaptable for vertical illumination interference microscopy and polarized light microscopy by mounting an appropriate unit on the eyepiece unit.

The objective in the base unit is at one side of the unit and a stage unit is adapted to be mounted adjacent to that side of the base unit—the eyepiece unit being mounted on the opposite side of the base unit. The stage unit contains a specimen stage to be in alignment with the objective when the stage unit is mounted on the base unit. It also contains an illuminating path with a condenser, or condensers, therein for condensing illumination and directing the condensed illumination axially through the specimen stage. The illumination is supplied by the illuminating unit which is adapted to be mounted against the side of the stacked units for this purpose.

The group of accessory units adapted to be utilized in a microscope consisting of an assemblage of separate units in accordance with the invention includes a filter unit which contains alternate light filters and/or a monochromator. The filter unit is adapted to be mounted between the illuminating unit and the stack of other units with the filters and/or monochromator being mounted therein for movement selectively into the paths for light from the light sources in the illuminating unit respectively to the illuminating path in the stage unit or to the base unit.

The invention will now be described in more detail with respect to the illustrative embodiments shown in the accompanying drawings in which.

Figure 1:
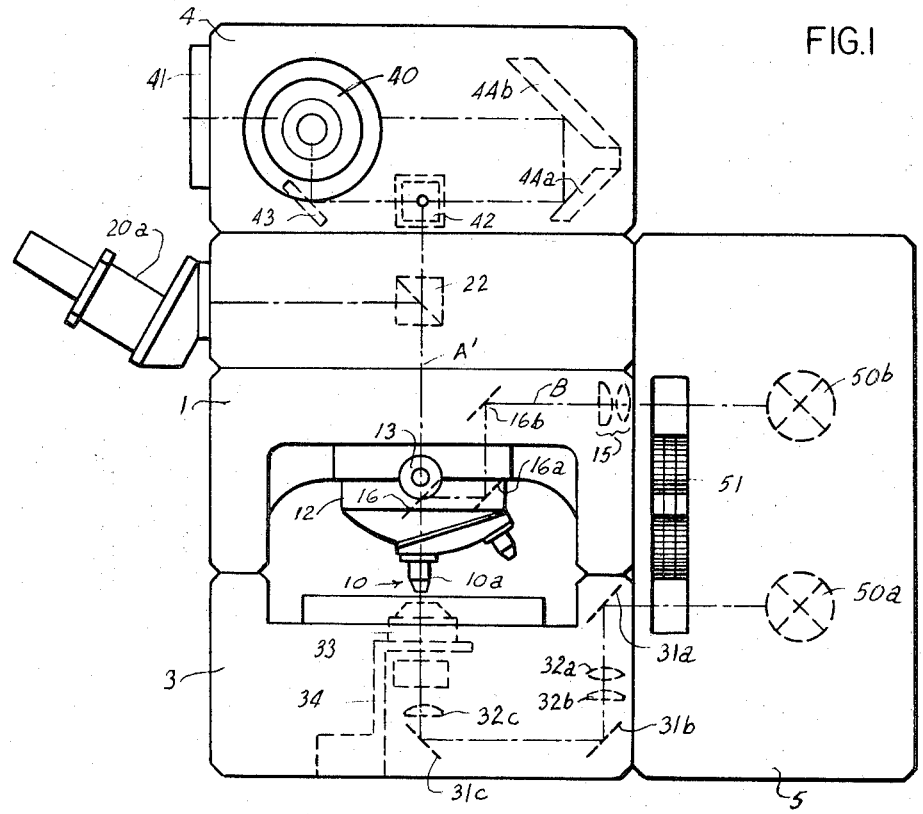
FIG. 1 is a side elevation of units in accordance with the invention assembled to form a microscspoe adapted for observation of a specimen disposed below the objective.
Figure 2:
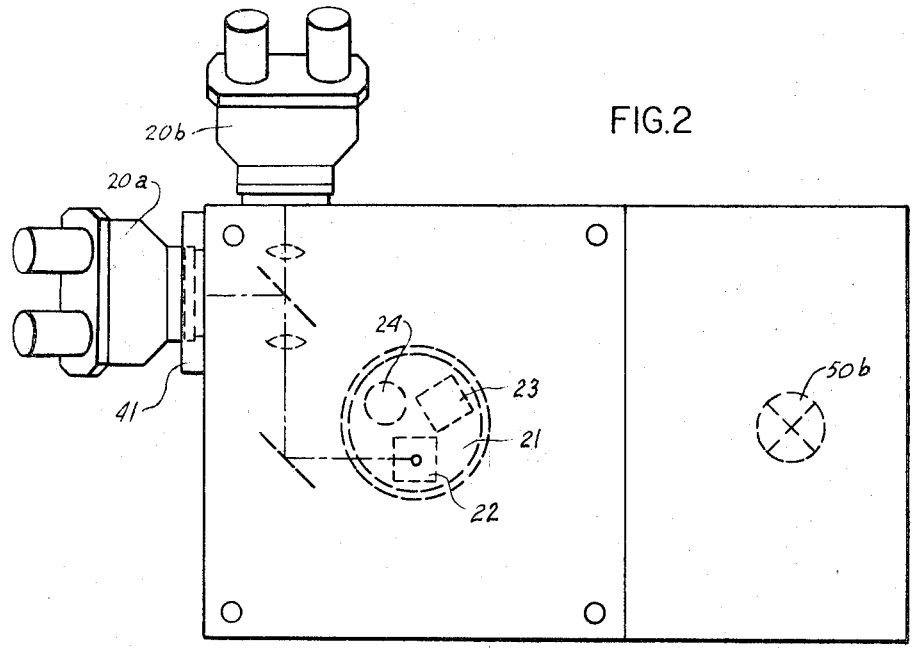
FIG. 2 is a top view of the microscope assembly of FIG. 1.

Referring to FIGS. 1 and 2, the microscope illustrated therein is formed by an assemblage of separate rectangular units consisting of a base unit 1, an eyepiece unit 2 mounted on the upper side of the base unit 1, a stage unit 3 mounted on the under side of the base unit 1, a reproducing unit 4 mounted on the upper side of the eyepiece unit 2, and an illuminating unit 5 mounted adjacent to the right hand side of the base unit 1 and the stage unit 3.

The base unit 1 carries the objective 10 of the microscope and has a straight vertical optical path through it defined by the optical axis of the objective 10. The objective 10 is provided by one of three different objective lenses 10a, 10b and 10c (FIG. 4) on a turret 11 which is rotatably mounted on an objective tube 12 for moving one or the other of the lenses 10a, 10b and 10c into the optical path A. The objective tube is axially movable by an adjusting screw 13 for focusing the objective 10, and a portion of the base unit 1 is open to the side of the unit as indicated at 14 to provide access to the adjusting screw 13 and turret 11.

The base unit 1 also has an illuminating path B, including lenses 15 and reflectors 16, 16a and 16b, for directing light from the illuminating unit 5 axially into the optical path A.

The eyepiece unit 2 has a straight optical path A′ vertically through it and two binocular eyepieces 20a and 20b. The optical path A′ is adapted to coincide with the optical path A of the base unit 1 when the eyepiece unit 2 is mounted on the base unit. The eyepieces 20a and 20b are mounted on different sides at one corner to enable two persons simultaneously to view the image of a specimen being examined by the microscope. The image is reflected from the optical path A′ to the eyepieces 20a and 20b by means of an image gating device 21 having a reflecting prism 22 adapted to be moved into the optical path A′. Suitable reflectors and lenses direct the image from the prism 22 to the eyepieces 20a and 20b.

The image gating device 21, which carries the reflecting prism 22 also carries a reflecting prism 23 of different orientation and has a hole 24 through it, the prisms 22 and 23 and the hole 24 being radially arranged on the device 21 which is rotatably mounted in the eyepiece unit 2 for selectively moving one of the prisms 22 or 23 or the hole 24 into the optical path A′. Moving the hole 24 into the optical path A′ permits the image projected therein to pass directly through the eyepiece unit 2 to an accessory unit, such as the reproducing unit 4, which may be mounted on the side of the eyepiece unit 2 opposite the side which abuts the base unit 1.

The stage unit 3 contains a specimen stage 30, which is adapted to be in line with the objective 10 of the base unit 1 when the stage unit 3 is mounted on the base unit. It also includes an illuminating path, defined by reflectors 31a, 31b and 31c and lenses 32a, 32b and 32c, for directing light from the illuminating unit 5 to a replaceable condenser 33 which is on a support indicated at 34. The condenser 33 directs a beam of light through the specimen stage 30 for illuminating a specimen on the stage 30.

The reproducing unit 4, shown mounted on the upper side of the eyepiece unit 2 in FIG. 1, contains a photographic miniature camera 40 and a support indicated at 41 on the outside wall of the unit at one side thereof for supporting a ground-glass plate or a sheet of sensitized material for reproducing an image projected thereon. The reproducing unit 4 also has a reflector 42 to be in alignment with the optical path A′ of the eyepiece unit 2 when the reproducing unit 4 is mounted on the eyepiece unit 2. The reflector 42 is adapted to direct an image-bearing beam of light impinging on it from the optical path A′ either to the camera 40 via a reflector 43, or via reflectors 44a and 44b, to a plate or sheet of material on the support 41.

The illuminating unit 5, which is mounted to be laterally adjacent to the base unit 1, and to the stage unit 3 in the assemblage shown in FIGS. 1 and 2, has two light sources 50a and 50b. The light source 50c is in line to supply light up through the specimen stage 30 via the illuminating path defined by reflectors 31a–c in the stage unit 3 and the light source 50b is in line to supply light to the optical path A in the base unit 1 via the illuminating path B. In operation, light is supplied either from light source 50a to pass up through the specimen stage 30, or, alternatively, from light source 50b to pass down through the optical path A, depending on the type of examination or measurement being applied. The element indicated at 51 in the illuminating unit 5 is an arrangement of control dials for selectively moving filters 80a–c (FIGS. 7 and 8), which are carried in a separate filter unit 8, subsequently described with reference to FIGS. 7 and 8.

Figure 3:
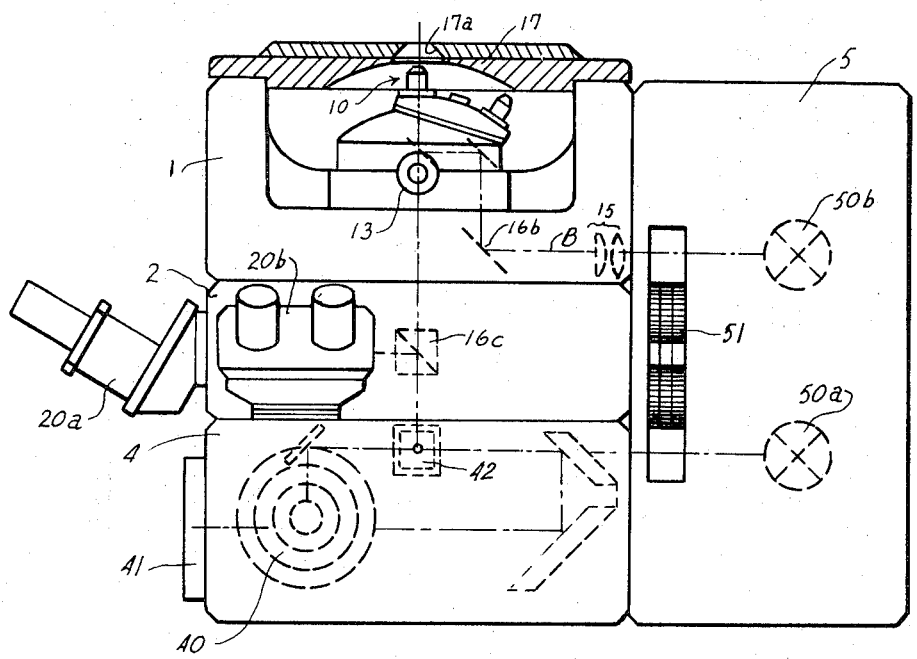
FIG. 3 is a side elevation of units in accordance with the invention assembled to form a microscope having a reversed path of rays, such as a metallurgical microscope.
Figure 4:
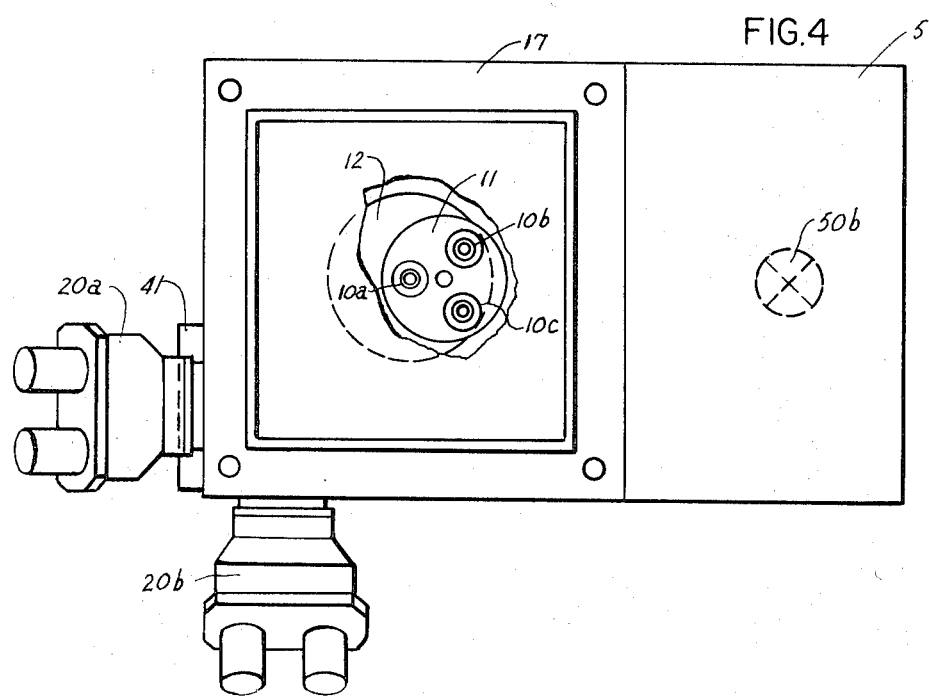
FIG. 4 is a top view of the microscope assembly of FIG. 3.

FIGS. 3 and 4 illustrate a microscope, such as a metallurgical microscope, in which the speciment being examined is illuminated by a beam of light, from illuminating unit 5, directed into the optical path of the base unit 1 and out through the objective 10. This microscope is formed of most of the same units utilized for the microscope shown in FIGS. 1 and 2. Only the stage unit 3 is omitted, but in this instance the units are in a different arrangement. Specifically, the base unit 1 is uppermost with its objective 10 facing upward and a speciment support 17 is mounted on the uppermost side with an aperture 17a in line with the objective 10 and the optical path A therethrough. The eyepiece unit 2, which is turned upside down, as compared with its position in the FIG. 1 microscope (so that the eyepieces 20a and 20b will be in convenient viewing position) is below the base unit 1 and the reproducing unit 4 is on the bottom. These units 1, 2 and 4 are thus in the same relative positions as in the FIG. 1 microscope, but they are reversed relative to the illuminating unit 5, which is mounted at one side of the other units so that only light from the light source 50b is direced into the optical path A via the illuminating path B. Light source 50a is blocked off, as shown, and its light is not utilized at all in this arrangement. The reproducing unit 4 is utilized for reproducing an image of a specimen, which is being examined, in the same manner as described with reference to the arrangement in FIGS. 1 and 2.

Figure 5:
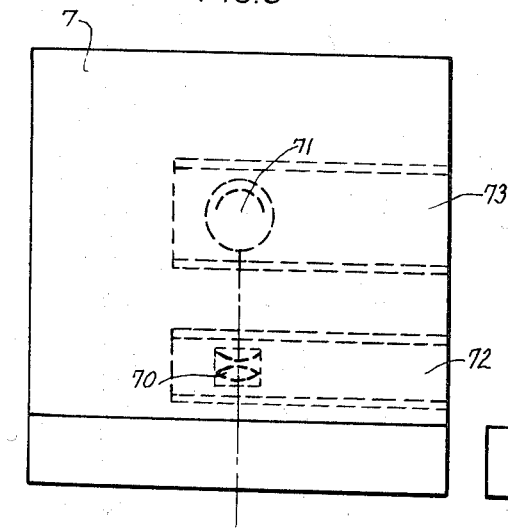
FIG. 5 is a side elevation of an attachment containing a photometric measuring device.
Figure 6:
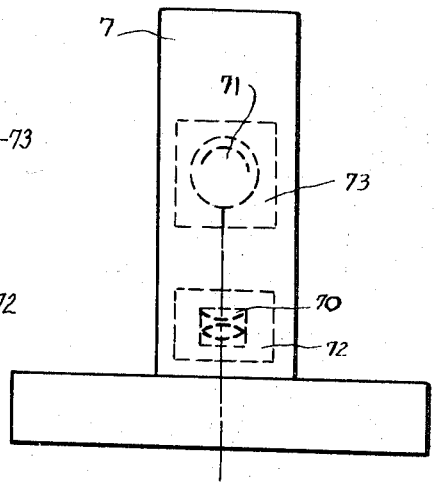
FIG. 6 is an end view of the attachment illustrated in FIG. 5.

FIGS. 5 and 6 illustrates a measuring unit 7 adapted to be mounted on the eyepiece unit 2, in place of the reproducing unit 4 in microscopes illustrated by the microscopes shown in FIGS. 1, 2 and 3, 4, for taking measurements of a specimen on the stage 30 (FIG. 1) or on the specimen support 17 (FIG. 3). The measuring unit 7 has projection lenses 7 which are in line with the optical axis A′ through the eyepiece unit 2 when the measuring unit is mounted thereon, and which project an image carried by a light beam in optical path A' onto a photoelectric measuring device 71. The lenses 70 and the measuring device 71 are replaceably mounted in inserts 72 and 73, which are removably received in the body of the measuring unit 7 so that they may be replaced respectively by lenses and by a measuring device of different types or capabilities.

In operation a light beam in the optical path A' in the eyepiece unit 2 passes to the measuring device 7 through the image gating device 21 which is either turned to enable the light beam to pass directly through the hole 24 in the device or turned to interpose the split image reflecting prism 22 in the optical path A' so that one branch of the split beam goes to the measuring device. The other branch goes to the eyepieces 20a and 20b.

Figure 7:
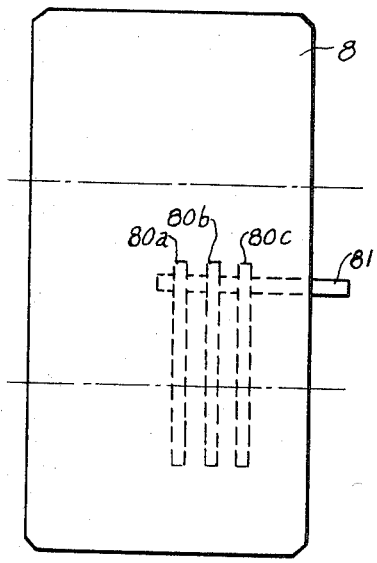
FIG. 7 is a side elevation of a filter attachment adapted to be inserted between an illuminating unit and other units which are assembled into an observation assembly.
Figure 8:
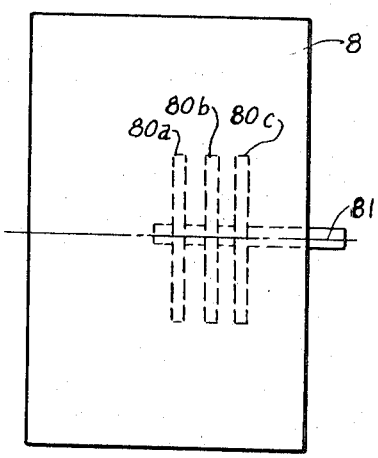
FIG. 8 is a top view of the filter attachment of FIG. 7.

FIGS. 7 and 8 show a filter unit 8 which is adapted to be inserted and mounted between the illuminating unit 5 and the other units of the microscope (i.e. the base unit 1 and stage unit 3 in FIG. 1 and the base unit 1 in FIG. 3) adjacent to which the illuminating unit 5 is mounted for supplying light thereto. The filter unit 8 contains several different filters 80a, 80b and 80c and/or a monochromator (not shown) mounted on a rotatable shaft 81 in position for rotation of the shaft to interpose selected filters and/or a monochromator in the paths of light from one or the other of the light sources 50a or 50b from the illuminating unit 5 either to the stage unit 3 (FIG. 1) or to the base unit 1 (FIGS. 1 and 3). When the filter unit 8 is mounted between the illuminating unit 5 and the other units comprising the microscope, the shaft 81 is engaged by an arrangement of dials and appropriate drive connections in the illuminating unit 5, as indicated at 51, the several dials being connected to selectively rotate the desired filters and/or monchromator into the path of light from the particular light source 50a or 50b which is being uilized for the illumination of a specimen being examined.

What is claimed is:

1. A microscope having its basic component parts and accessory parts grouped in separate units which are adapted to be cooperatively mounted on one another in alternative arrangements to provide a microscope having a variety of selectable capabilities, said units including: a base unit having optical means for directing light in a straight optical path therethrough and an objective operatively and adjustably mounted in said path at one side of the base unit, an eyepiece unit having optical means for directing light in a straight optical path therethrough and an eyepiece operatively connected to the unit for viewing an image projected through the latter path from one side of said path, said eyepiece unit being removably mounted on the base unit with its optical means in alignment with the optical means of the base unit for the optical path respectively therethrough to be in longiudinal alignment said base unit having a passage for illumination therein with one end of said passage opening to the outside of the unit and the other end opening into the optical path through the base unit and a reflector mounted in said passage directing illumination through the passage axially into said optical path, an illuminating unit mounted adjacent to the base unit having a light source and a passage conducting light therefrom into the illuminating passage of the base unit, a light gating device having at least one reflecting means and an opening therethrough movably mounted in the eyepiece unit selectively moving the reflecting means and the opening, respectively, into the optical path through the eyepiece unit, at least one of said reflecting means reflecting an image which is projected through said optical path to said eyepiece when said reflecting means is in said optical path, and said opening leaving said optical path unobstructed when the device is moved to interpose the opening in said path, a stage unit having a specimen stage mounted therein and selectively mounted on the side of the base unit at which said objective is located with the specimen stage axially in line with the optical path through the base unit, said stage unit having an illuminating passage therein with one end opening to the outside of the unit and the other end in line with the axis through the specimen stage and having reflecting means and condensing means in said illuminating passage condensing illumination therein and directing the condensed illumination through the specimen stage axially into the optical path through the base unit on which the stage unit is mounted, and a second illuminating unit selectively mounted adjacent to the stage unit when the stage unit is mounted on the base unit, said second illuminating unit having a light source and a passage conducting light therefrom into the illuminating passage of the stage unit when the second illuminating unit is mounted adjacent to the stage unit.

2. The microscope of claim 1 including light filter means received between the light sources and the base unit and the stage unit respectively and filtering the light passing from the light sources to the base unit and to the stage unit respectively.

3. The microscope of claim 1 in which the illuminating unit mounted on the base unit when the eyepiece unit is mounted thereon and said second illuminating unit are incorporated in a single illuminating unit mounting both of said light sources and said paths for light therefrom, the single illuminating unit being selectively mounted adjacent to the base unit selectively in one of two positions relative to the base unit with one of the light sources mounted therein directing light from said one source into the illuminating passage of the base unit in each of said positions of the illuminating unit, the other light source directing light from it into the illuminating passage of the stage unit when the stage unit is mounted on the base unit and the single illuminating unit is mounted in one of said positions relative to the base unit.

4. The microscope of claim 3 in which said units include a filter unit mounted between said single illuminating unit and the base unit when the single illuminating unit is in either one of its said positions, said filter unit having at least one light filter selectively movable into the paths of light through the passages for light from the respective light sources.

5. The microscope of claim 1 in which said units include a measuring unit carrying light responsive measuring means with a passage conducting light from one side of the measuring unit to said measuring means, said measuring unit being mounted on the side of the base unit at which said objective is located with its said passage to the measuring means in line with the optical path through the base unit in one arrangement of the units and being mounted on one side of the eyepiece unit with its said passage to the measuring means in line with the optical path through the eyepiece unit in another arrangement of the units.

References Cited

UNITED STATES PATENTS

| | | | |
|---|---|---|---|
| 373,634 | 11/1889 | Bausch | 350—87X |
| 2,209,532 | 7/1940 | Michel | 350—19X |
| 2,753,760 | 7/1956 | Braymer | 350—34X |
| 3,173,984 | 3/1965 | Vogl | 350—36 |

FOREIGN PATENTS

| | | | |
|---|---|---|---|
| 607,827 | 12/1934 | Germany | 30—86 |

PAUL R. GILLIAM, Primary Examiner

U.S. Cl. X.R.

350—19, 87, 90